United States Patent [19]

Christ

[11] 4,078,320
[45] Mar. 14, 1978

[54] EDUCATIONAL APPARATUS

[75] Inventor: Wayne L. Christ, Pittsburgh, Pa.

[73] Assignee: Beth-Way Litho, Pittsburgh, Pa.

[21] Appl. No.: 791,229

[22] Filed: Apr. 27, 1977

[51] Int. Cl.² .............................................. G09B 1/22
[52] U.S. Cl. .......................................... 35/74; 40/495
[58] Field of Search ...................... 35/31 A, 35 F, 74; 40/70 R

[56] References Cited

U.S. PATENT DOCUMENTS

| 1,530,404 | 3/1925 | Pearce | 40/70 R |
| 1,728,584 | 9/1929 | Wright | 35/74 |
| 1,833,793 | 11/1931 | Pfleger | 35/74 X |
| 3,200,517 | 8/1965 | D'Agostino | 35/35 F |
| 3,553,867 | 1/1971 | Behren | 40/70 R |
| 4,043,055 | 8/1977 | Zegel | 40/70 R X |

FOREIGN PATENT DOCUMENTS 394,041   6/1933   United Kingdom ..................... 35/74

Primary Examiner—Harland S. Skogquist
Attorney, Agent, or Firm—Thomas H. Murray

[57] ABSTRACT

At each of four spaced-apart locations between stiff sheet members two, but preferably three, discs are rotatably supported by pivot elements. The upper and lower discs have a smaller diameter than the disc between them whereby an annularly-shaped marginal face surface of a central disc is exposed. Each marginal face surface and the face surface of the smaller discs contain printed indicia which is selected by rotating the discs for positioning into an aligned relation with window openings cut into the sheet members. These window openings are, in turn, aligned with window openings in a selected one of a plurality of cover sheets. A peripheral edge segment of each disc extends outwardly beyond the edges of the sheet members.

8 Claims, 3 Drawing Figures

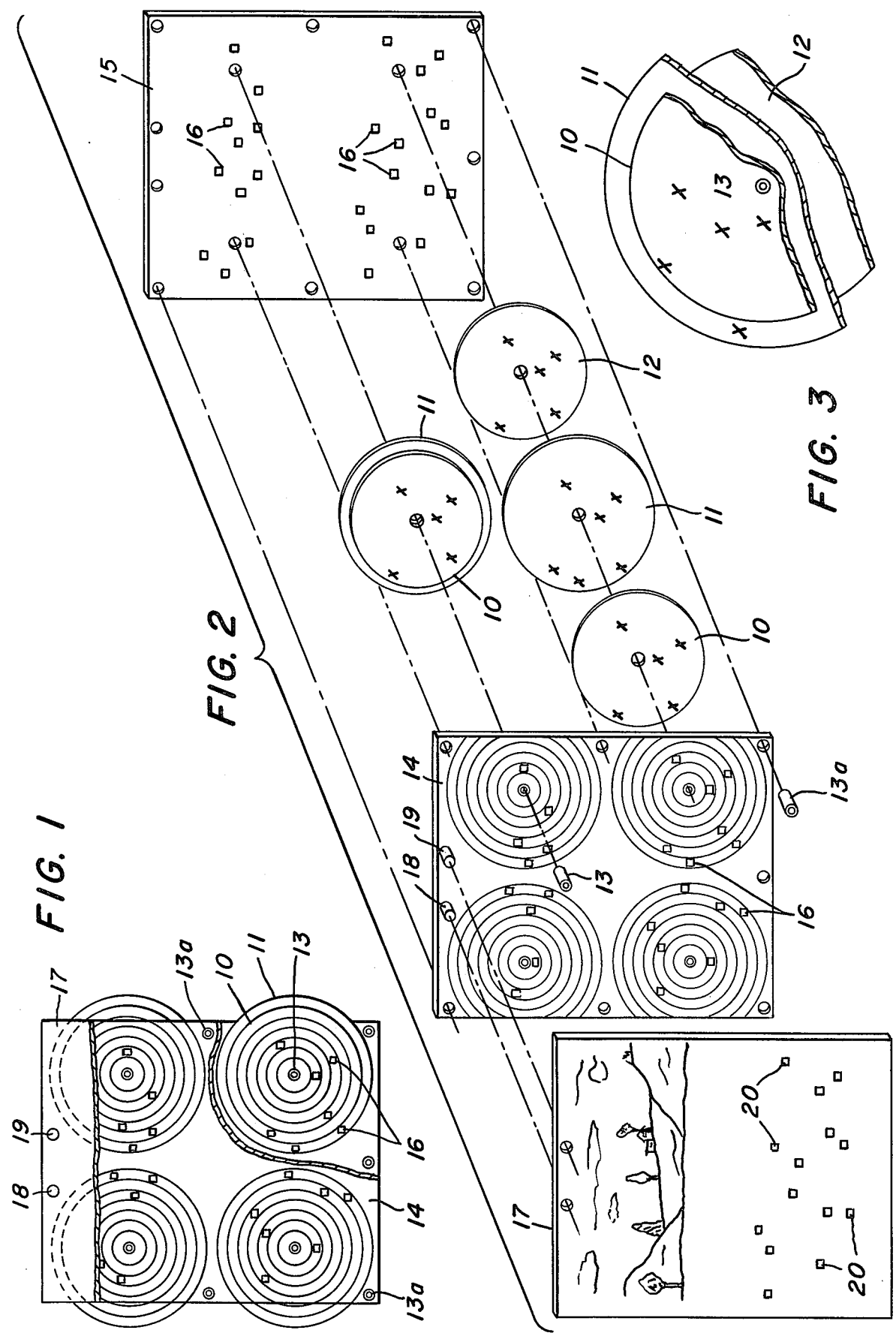

EDUCATIONAL APPARATUS

BACKGROUND OF THE INVENTION

This invention relates to an educational apparatus to enhance the learning process as applied to spelling, reading and/or arithmetic skills. More particularly, the present invention relates to providing such an apparatus which is designed and constructed to provide increased versatility and usefulness as such a teaching aid.

Various educational apparatus have been proposed and, in some instances, used to enhance the learning process of certain fields of basic skills. Flash cards, for example, are effective but suffer from disadvantages such as cost, bulkiness including the size and inherent disadvantages in regard to the speed at which the cards can be handled and manipulated. Moreover, flash cards are extremely limited for a single purpose and field of educational value. Once the flash cards have served their intended purpose, their usefulness cannot be extended but, instead, become items which require safe storage to insure their integrity.

The element of cost becomes excessively large in single-purpose devices and apparatus for teaching basic learning skills. It is, therefore, desirable to provide an apparatus which is useful in the learning process associated with a given subject or even more than one subject.

SUMMARY OF THE INVENTION

It is an object of the present invention to provide an educational apparatus including a multiplicity of window openings exposed through aligned window openings in an overlay sheet for displaying individually-selectable indicia printed on a plurality of at least two superimposed and individually-rotatable discs.

It is a further object of the present invention to provide an educational apparatus including a plurality of three superimposed discs rotatably supported by a pivot element for coaxial rotation at each of the spaced-apart locations between sheet members which are adapted to receive a cover sheet in an overlying relation containing window-like openings aligned with window openings in the sheet members to expose selectable indicia printed on the face surfaces of pairs of the discs and selected according to the subject matter printed on the cover sheet.

More particularly, according to the present invention, there is provided an apparatus comprising, in combination, a pair of superimposed rectangular sheet members of stiff material, a plurality of pairs of discs rotatably supported between the members, the pairs of discs being mounted for coaxial rotation on pivot elements supported by the sheet members, the upper disc of each superimposed pair having a smaller diameter than the diameter of the disc below it to expose an annularly-shaped marginal face of the lower disc, each disc having a peripheral edge segment located outwardly beyond the side edges of the sheet members for independent manual rotation of the disc, the upper member of the sheet members having a plurality of window openings arranged to expose a portion of the face surface of each disc, each pair of superimposed disc including indicia printed on the exposed face surfaces thereof for positioning by rotation of the disc into an aligned exposed relation with the window openings in the face sheet, and a cover sheet releasably supported upon the upper sheet member, the cover sheet including printed indicia and a plurality of window openings alignable with the window openings in the upper sheet to expose indicia printed on at least one pair of the discs by selective positioning of the disc.

In the preferred form of the present invention, three superimposed discs are mounted by a single pivot element for rotation about a common axis between the sheet members. The intermediate disc of each three superimposed discs having a substantially larger diameter than the diameter of the remaining disc to expose an annularly-shaped marginal face at each side of the intermediate disc. Each of the sheet members is adapted to support an overlay sheet with window openings therein alignable with the window openings in the sheet member to expose indicia printed on the exposed face surfaces of two of the discs forming each set.

These features and advantages of the present invention as well as others will be more fully understood when the following description is read in light of the accompanying drawing, wherein:

FIG. 1 is a plan view, partly in section, to show the various parts of the educational apparatus according to the present invention;

FIG. 2 is an exploded view illustrating in greater detail the parts of the educational apparatus of the present invention; and FIG. 3 is an enlarged view illustrating one set of three discs forming part of the present invention.

As shown in FIGS. 1–3, the educational apparatus includes a plurality of sets of three discs 10, 11 and 12. Each set may consist of only two discs. The discs of each set are secured for rotation about a common pivot element such as a rivet 13. According to the preferred form of the present invention, four sets of three discs are positioned at quarter points between sheet members 14 and 15. The rivets 13 are passed through openings in sheet member 15, for example, thence through a set of three discs and passed outwardly from sheet member 14 where the rivet is retained in position by a bent-over portion thereof. The sheet members 14 and 15 are typically made from stiff material such as cardboard, bristol board or the like. The sheet members 14 and 15 are secured together at their corners and midway between their corners by rivets 16A at locations that will not impair the rotation of the discs 10-12. In the preferred form of the present invention, each facing sheet 14 and 15 includes window-like openings 16 that are typically die-cut at radially-spaced points from each rivet 13 to expose at least one face portion of each of two discs in each set of three discs. Specifically, the window-like openings 16 are located to expose printed indicia on the face surfaces of two discs, e.g., discs 10 and 11. The discs are manually rotated by contacting an arcuate peripheral edge segment of each disc which projects outwardly beyond an edge surface of sheets 14 and 15. As shown in the drawing, the uppermost disc, for example, disc 10, has a smaller diameter than disc 11 below it whereby an annular face surface of disc 11 is exposed and contains printed indicia alignable with the window openings in the face sheet. It is further important aspect of the present invention to provide an overlay sheet 17 which is removably secured or retained in a fixed position upon the upwardly facing sheet 14 by projecting pins 18 and 19. The overlay sheet includes window-like openings 20 alignable with the window-like openings that expose a portion of at least one set of discs but preferably two sets of discs. The window-like openings in the overlay sheet are located within quadrants of the sheet and preferably only two quadrants of the sheet are provided with window-like openings while the remaining two quadrants contain printed indicia in the form of words and/or pictorial displays strategically positioned in relation to the window openings to require a student to select the appropriate indicia by rotation of a disc to be displayed in the window-like opening. Preferably, the overlay sheets are made from opaque and tear-resistant material such as presently sold by DuPont under the trademark TYVEK. It is intended, according to the present invention, that a plurality of overlay sheets containing different pictorial displays and/or printed information will be available for use. The pictorial displays and quadrants with window-like openings in the various overlay sheets will be arranged in different patterns whereby different sets of discs are used with different overlay sheets on the basis of the indicia which is printed on the face surface of the discs.

In accordance with the present invention, it is necessary that at least two discs be supported by a single rivet for coaxial rotation. As previously described, three such discs are illustrated in the drawing whereby an overlay sheet is placed upon either of the facing sheets 14 or 15. An annular exposed face surface of disc 11 is provided with printed indicia on both sides with the superimposed discs 10 and 11 being of smaller diameter and each containing printed indicia exposed by positioning the disc to align the indicia with window-like openings in the cover and overlay sheets.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An educational apparatus comprising, in combination, a pair of superimposed rectangular sheet members of stiff material, a plurality of pairs of discs rotatably supported between said members, the pairs of discs being mounted coaxially for rotation on pivot elements supported by said members, the upper disc of each superimposed pair having a smaller diameter than the diameter of the lower disc to expose an annularly-shaped marginal face of the lower disc, each disc having a peripheral edge segment located outwardly beyond the side edges of said members for independent manual rotation of the discs, the upper member of said sheet members having a plurality of window openings arranged to expose a portion of the face surface of each disc, each pair of superimposed discs including indicia printed on the exposed face surfaces thereof for positioning by rotation of the discs into an aligned exposed relation with the window openings in the face sheet, and a cover sheet releasably supported upon the upper sheet member, said cover sheet including printed indicia and a plurality of window openings therein alignable with the window openings in the upper sheet to expose indicia printed on at least one pair of discs by selective positioning of the discs.

2. The educational apparatus according to claim 1 wherein said plurality of pairs of discs is further defined to include a plurality of three superimposed discs mounted for coaxial rotation on pivot elements carried by said sheet members with a peripheral edge segment of each disc located outwardly beyond said sheet members for independent rotation of said discs, the intermediate disc of each three superimposed discs having a substantially larger diameter than the diameter of the two remaining discs to expose an annularly-shaped marginal face of each side of the intermediate disc, and wherein both of said sheet members include a plurality of window openings to expose portions of two of each three superimposed discs.

3. The apparatus according to claim 1 further comprising support pins extending from the upper sheet member for releasably supporting said cover sheet.

4. The educational apparatus according to claim 1 further comprising means to secure said sheet members together at a plurality of spaced-apart locations.

5. The apparatus according to claim 4 wherein said pivot elements secure said sheet members together.

6. The educational apparatus according to claim 1 wherein said plurality of pairs of discs includes four pairs of discs, and wherein said plurality of window openings in said cover sheet exposes indicia printed on only two of the four pairs of discs.

7. The educational apparatus according to claim 6 wherein said cover sheet includes a plurality of said cover sheets adapted for selective support of said upper sheet member, said plurality of cover sheets including printed indicia and a plurality of window openings alignable with the opening in the upper sheet to expose indicia printed of different combinations on only two of the four pairs of discs.

8. The apparatus according to claim 7 wherein said plurality of cover sheets includes pictorial illustrations.

* * * * *